(12) United States Patent
Chamot et al.

(10) Patent No.: US 6,343,746 B2
(45) Date of Patent: Feb. 5, 2002

(54) MOTORIZED THERMOSTATIC DEVICE WITH BACKUP THERMOSTATIC ELEMENT

(75) Inventors: Jean-Pierre Chamot, Arpajon; Gérard Jean André Le Clanche, Draveil, both of (FR)

(73) Assignee: Vernet S.A., Arpajon (FR)

(*) Notice: Subject to any disclaimer, the term of this patent is extended or adjusted under 35 U.S.C. 154(b) by 0 days.

(21) Appl. No.: 09/729,775

(22) Filed: Dec. 6, 2000

(51) Int. Cl.[7] .................................................. F01P 7/02
(52) U.S. Cl. .......................................... 236/34.5; 236/84
(58) Field of Search ........................ 236/34, 34.5, 84, 236/DIG. 2

(56) References Cited

U.S. PATENT DOCUMENTS

| 4,453,668 A | 6/1984 | Abel |
| 4,550,693 A | 11/1985 | Saur |
| 5,970,996 A | 10/1999 | Markey et al. |

FOREIGN PATENT DOCUMENTS

| FR | 2 703 730 | 10/1994 |

*Primary Examiner*—William E. Tapolcai
*Assistant Examiner*—Mohammad M. Ali
(74) *Attorney, Agent, or Firm*—Wenderoth, Lind & Ponack, L.L.P.

(57) ABSTRACT

A housing has a chamber comprising fluid accesses, at least one of which can be plugged by a plug; a reversible motor equipped with a rotary shaft is connected to the plug by a coupling involving a screw-nut system to move it in translation towards plugging or uncovering the pluggable access according to the temperature of a stream of fluid travelling through the device; and a thermostatic element located in the same stream of fluid actuates the plug if the motor or its controls fail. In order to prevent the plug from then reverting to its initial position when the element retracts, the coupling is inelastic and the screw-nut system is reversible so that when the plug is actuated by the thermostatic element, the motor is made to rotate.

12 Claims, 3 Drawing Sheets

MOTORIZED THERMOSTATIC DEVICE WITH BACKUP THERMOSTATIC ELEMENT

Figure 2:
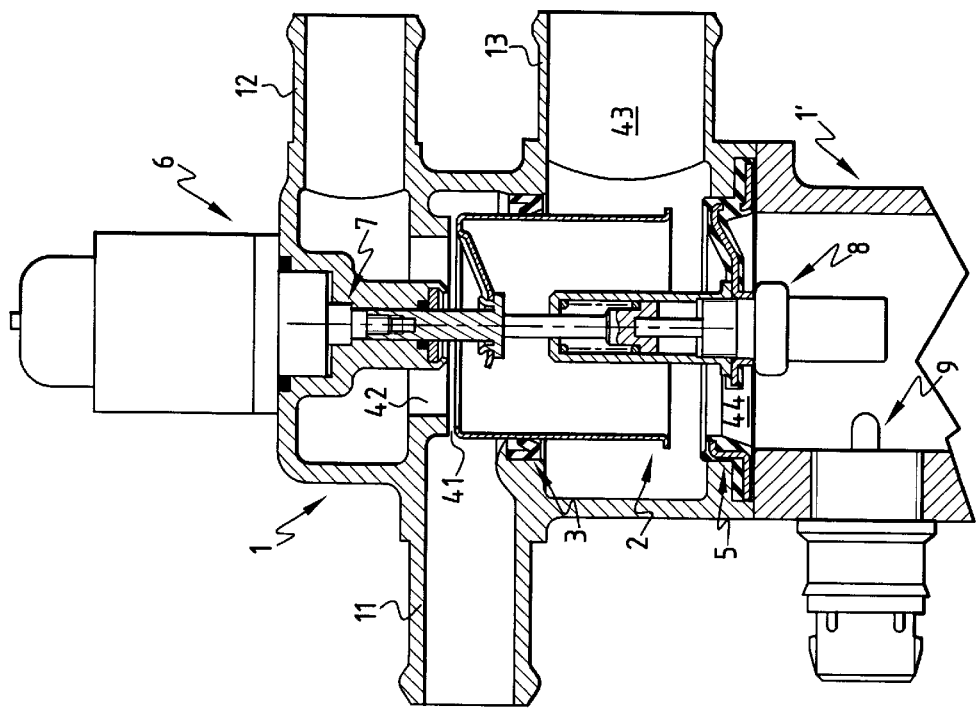

The invention relates to a thermostatic device of the electric-motor-actuated valve type comprising a thermostatic element which may be a conventional expanding-wax thermostatic element so that it also has a backup mode of operation in the event of failure of the motor or of its control equipment.

Thermostatic devices of the valve type are used in particular in internal combustion engine cooling circuits to regulate the temperature of the cooling liquid introduced into this engine to optimize its operation, by influencing the flowrate of so-called "cold" liquid from the vehicle radiator and/or the flowrate of so-called "hot" liquid from the engine, which are mixed to form a so-called "warm" cooling liquid which is reintroduced into the engine. Note that the terms "cold", "hot", and "warm" are used with a view to simplifying the vocabulary used to indicate the relative temperature levels of the three streams of liquid when the device is operating in the steady state, but that in fact the respective temperatures of these three streams may be very similar, and are identical when the engine has been stopped for some time.

Thermostatic devices motorized by means of an electric motor comprising a backup thermostatic element allowing, for example, a stream of cold liquid to be mixed in a chamber of the device with the stream of hot liquid even when the motor or its control equipment fail, if the temperature of the liquid in which the thermostatic element is immersed exceeds a desired value, are already known, particularly from French patent published under the number 2 703 730.

The thermostatic device in this document 2 703 730 is motorized by means of an electric motor comprising a rotary output shaft which, by means of a conventional screw-nut coupling system converting the rotary movement of the shaft into a translational movement, actuates the moving plug of the thermostatic device, namely a spool, which gradually uncovers a cold liquid inlet access of this device at the same time as gradually plugging a hot liquid inlet access, and vice versa; the backup thermostatic element is aligned with the screw of the screw-nut system and when its temperature rises, its piston exerts on the spool, if the latter has not been moved or has been insufficiently moved, via the screw-nut system, a force directed in the direction for uncovering the cold liquid inlet access and plugging the hot liquid inlet access; so that under the thrust of the piston of the thermostatic element, the spool can actually move in this direction, the screw-nut system coupling is telescopic and, more specifically, mounted so that it can slide on the shaft of the motor while being urged toward the spool by a spring in the direction for uncovering the hot liquid inlet access and plugging the cold liquid inlet access; hence, when the thermostatic element exerts on the spool a force in the opposite direction which exceeds the spring force, to plug the hot liquid inlet access and uncover the cold liquid inlet access, the spring is compressed by the retraction of the screw-nut system and so nothing opposes these respective plugging and uncovering movements. A drawback with this device is that when the temperature of the liquid in which the thermostatic element is immersed drops, the screw-nut system accompanies the retracting movement of the thermostatic element which, because the electric motor or its control equipment has failed, leads to a further temperature rise, a further elongation of the thermostatic element, and operation which tends towards the unstable with a "warm" liquid at a temperature higher than the normal temperature. Furthermore, the thermostatic element has to be relatively powerful in order to overcome the resistive force of the spring, and the screw-nut system with its telescopic spring-loaded mounting is relatively bulky, which means that the dimensions of the thermostatic device cannot be reduced as much as might be desired.

The object of the invention is to overcome these drawbacks and the invention therefore relates to a thermostatic device comprising a housing which has a chamber comprising at least two fluid accesses, at least one of which can be plugged by a plug, a motor fixed to the housing and equipped with an output shaft that is able to move in terms of rotation and with reversible direction of rotation, connected mechanically to the plug by a coupling involving a screw-nut system designed to actuate this plug in terms of translation, selectively, in a direction in which it gradually plugs the pluggable access and in a direction in which it gradually uncovers it according to the temperature of a stream of fluid travelling through the device and detected by a sensor, and a backup thermostatic element located at least partially in the same stream of fluid and comprising a moving part designed to actuate the plug in terms of translation when, as the result of a failure, this plug has not been actuated by the screw-nut coupling system and the temperature of the said stream of fluid exceeds by a predetermined value the temperature that should have caused such actuation by the screw-nut system, characterized in that the motor is of a type which, at rest, presents a resistive torque so as to allow a set position to be maintained, the coupling involving a screw-nut system is substantially inelastic and the screw-nut system is reversible so that if the plug is actuated in terms of translation by the moving part of the thermostatic element, the translational movement is transmitted by the plug to. the screw-nut system and causes the motor to rotate.

Owing to the reversibility of the screw-nut system and of the direction of rotation of the motor and to the translational inelasticity of the coupling, movements of the plug by the thermostatic element encounter only a low resistive force, and retraction of the thermostatic element does not cause elastic return of the plug to its initial position.

The thermostatic device may furthermore exhibit one or more of the following features:
- the motor is an electric motor of a type which is electrically powered at rest so that it presents a resistive torque that is appreciably higher than the torque due to friction, for example a stepping motor or a motor with no commutator otherwise known as a brushless motor,
- the motor is a stepping motor equipped with position-encoding means,
- the predetermined value is about 5° C.,
- it comprises a housing and a base fixed together, the base comprising a pipe into which there opens an access of the chamber which is not pluggable and in which a sensor and a fixed part of the thermostatic element are at least partially situated,
- the chamber comprises two accesses that can be plugged by a plug consisting of a spool actuated selectively in a direction in which it gradually plugs one of the accesses while gradually uncovering the other, and vice versa,
- it further comprises two accesses which cannot be plugged by the plug and which are constantly in communication,
- the chamber comprises two accesses, one of which can be plugged by a plug consisting of a shutter actuated selectively in a direction in which it gradually plugs, one of the accesses and vice versa, it comprises a housing and a base fixed together, the base comprising a pipe into which there opens an access of the chamber which is not pluggable and into the side wall of which there opens an additional access which is also not pluggable, the thermostatic element comprises a cup to which a bypass sealing shutter is secured, and the base internally comprises a chamber into which there opens a bypass access and which is connected to the internal region of the pipe by a seat for the bypass sealing shutter which is in the widest-open position when the plug is in the closed position and in the closed position when the sensor detects a very high temperature.

Figure 1:
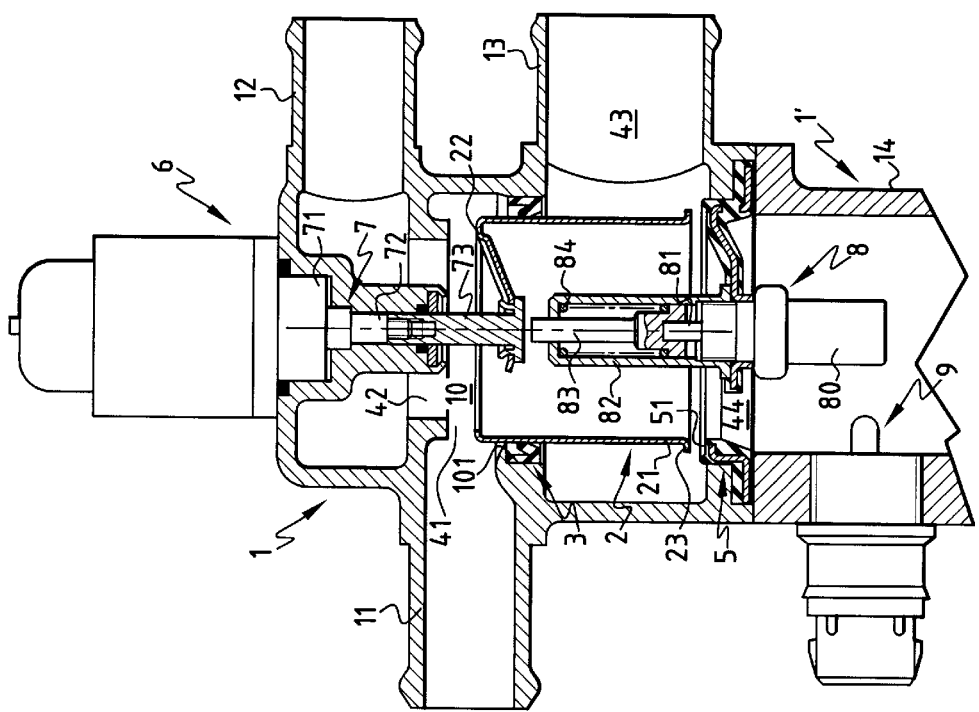
Figure 4:
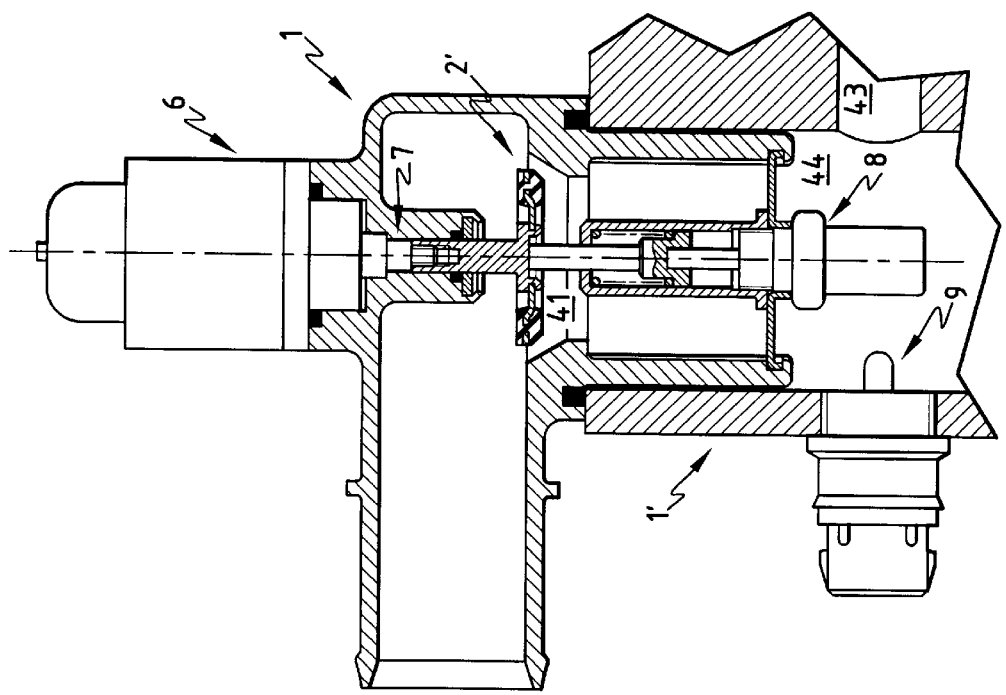
Figure 3:
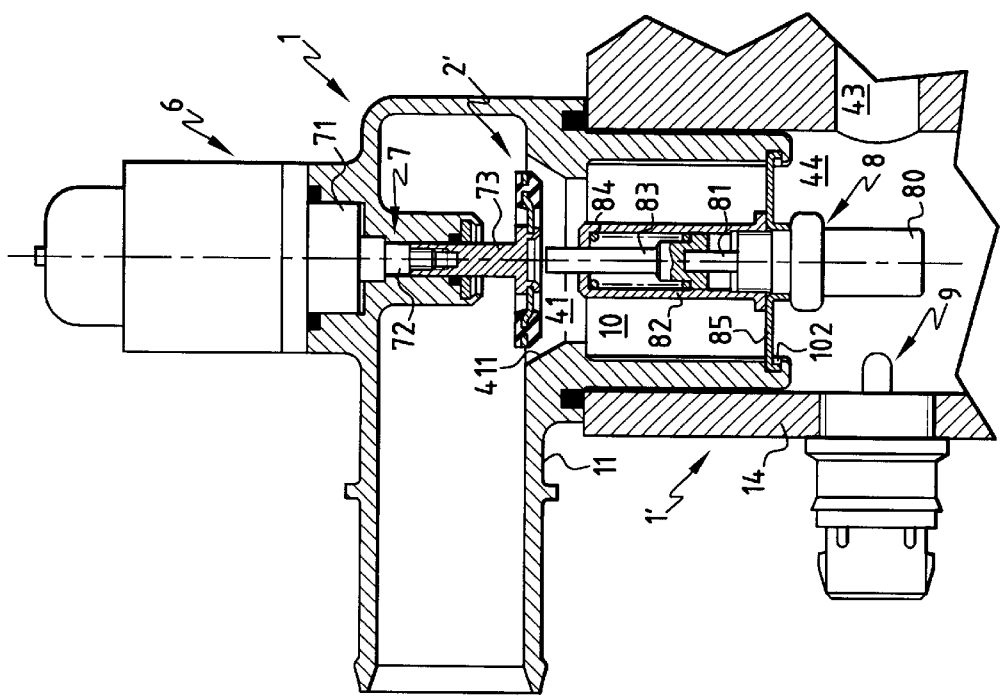
Figure 5:
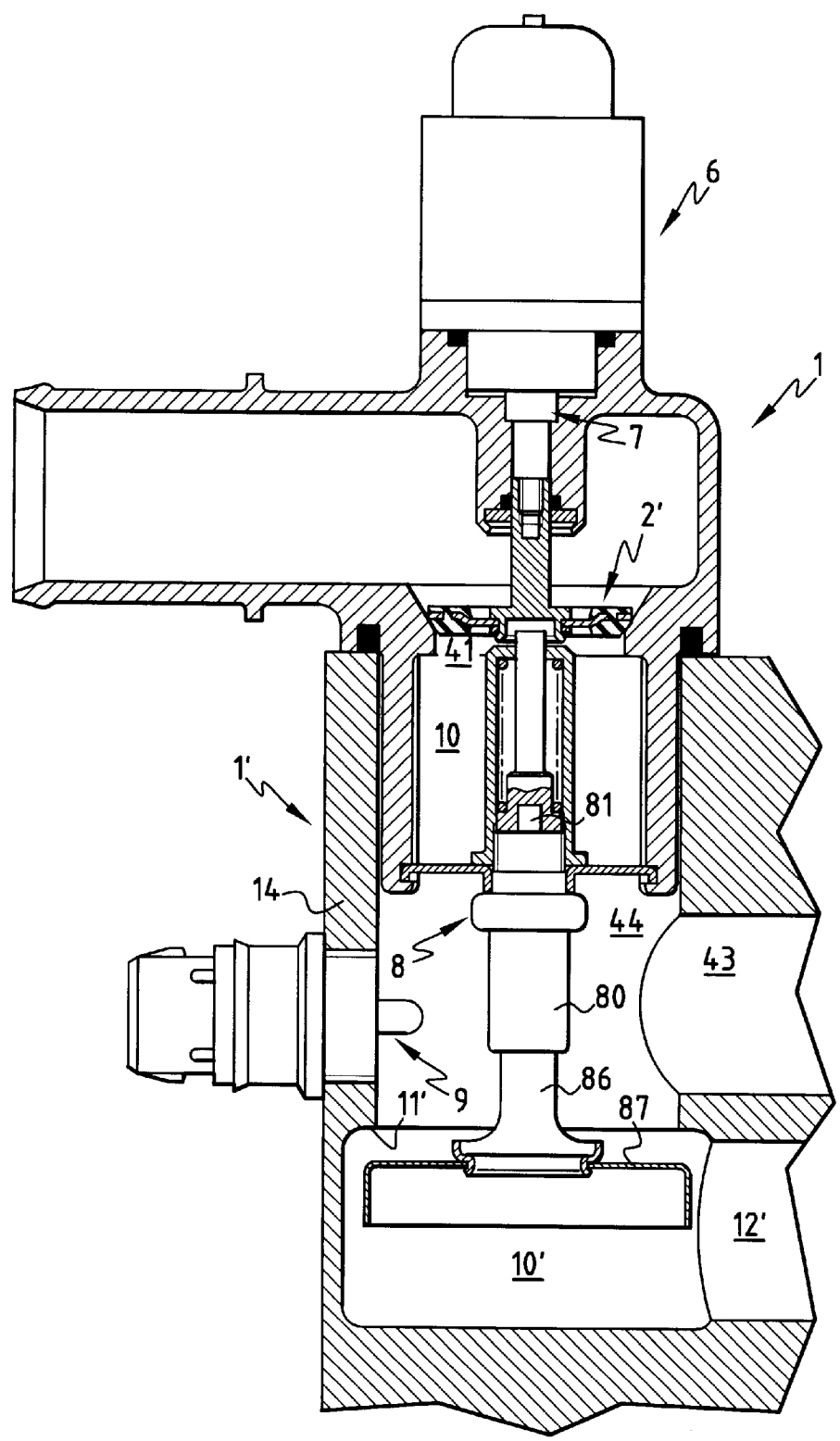

Other features and advantages of the invention will emerge from the description which will follow of some embodiments of the invention which are given by way of non-limiting examples, illustrated by the appended drawings in which:

FIGS. 1 and 2 diagrammatically show a first embodiment of the thermostatic device according to the invention respectively in a state in which the moving plug of the device is subjected to the action of the motor in the absence of failure thereof and/or of its control equipment, and in a state in which the motor and/or its control equipment have failed and the backup thermostatic element has taken over to lower the temperature of the warm fluid, for example a liquid, FIGS. 3 and 4 diagrammatically show a second embodiment of the thermostatic device according to the invention, in the same two states as in FIGS. 1 and 2 respectively, and FIG. 5 diagrammatically shows an alternative form of the device of FIGS. 3 and 4.

The thermostatic device depicted diagrammatically in FIGS. 1 and 2 is a spool-type thermostatic valve with four fluid accesses or ports which may be fluid inlets or outlets according to the hydraulic circuit in which the device is inserted.

It comprises a housing 1 having a chamber 10 in which there is mounted, so that it can slide, a plug 2 consisting of a hollow spool comprising a skirt 21 of cylindrical overall shape and, at one end of this skirt, a perforated end 22 whose role will be explained later on, while the opposite end of the skirt has a flared part in the form of a flat annular disc 23.

The spool is guided in its sliding movement along the longitudinal central axis of its cylindrical skirt by a cylindrical wall part 101 of the chamber, with the insertion of a seal 3; this cylindrical wall part 101 surrounds the spool 2 near its perforated end 22.

Opening into the wall in the region of the chamber 10 outside the skirt, at the same end as the perforated end 22, is a first fluid access 41 in the lateral part of this wall, and a second fluid access 42 centered on the longitudinal central axis of the skirt in the bottom part of the wall placed facing the perforated end 22; the first fluid access 41 can therefore be plugged by the skirt of the spool gradually from a position of the spool in which its end 22 is flush with the access 41, to a position in which this perforated end 22 butts against the bottom part of the wall of the chamber into which the second access 42 opens (in this instance without plugging this access), and can be gradually uncovered in the opposite direction.

Opening into the lateral part of the wall of the chamber 10 outside the skirt which is opposite the latter when the first access 41 is completely uncovered is a third fluid access 43 which is therefore completely plugged by the skirt when the first access 41 is completely uncovered, and which is gradually uncovered by it when this first access is gradually plugged (and vice versa).

Finally, a fourth access 44, centered on the longitudinal axis of the skirt and which is not pluggable by this skirt, opens into the wall of the region of the chamber 10 inside the skirt opposite the one that has the second access 42.

The first access 41 and the third access 43, which are pluggable by the skirt 21, are end orifices of pipes 11, 13 formed in one piece with the housing 1 and which extend in a radial direction with respect to the skirt, starting from the lateral wall of the chamber. The second access 42 is an end orifice of an elbowed pipe 12, of which the part located beyond the elbow starting from the second access extends in the same direction as the second pipe 12, but in this instance in the opposite sense. The fourth access 44 of the chamber 10 opens directly, the housing 1 being designed to be fixed to a housing base 1' to which the housing 1 can be fixed by screws passing through respective flanges of the housing 1 and of the base 1'; in this instance, the chamber 10 is therefore extended, beyond the fourth access 44, by a pipe 14 belonging to the base 1', extending in the direction of the longitudinal central axis of the skirt 21.

A spool seat 5, perforated for reasons which will be explained later on, extending in the fourth access 44, is trapped between the housing 1 and the base 1'; a part of this seat 5, extending angularly into the fourth access 44, has one annular face 51 facing towards the inside of the chamber and, more precisely, towards the perforated end 22 of the skirt, this face 51 acting as a seat for the flared disc-shaped part 23 of the skirt of the spool.

To actuate the spool 2 in translation selectively in one direction or the other along the longitudinal central axis of the skirt 21, an actuator 6 is fixed to the housing and, more precisely, to the lateral wall of the second pipe 12. This actuator consists of an electric motor 6 equipped with an output shaft which can move in rotation and has a reversible direction of rotation, of the stepping type or type with no commutator also known as brushless motor, or alternatively of some other type which, when electrically powered at rest, then presents a resistive torque which is appreciably higher than that due to friction so as to allow a set position to be maintained, carrying a mechanical coupling 7 for connecting the output shaft to the spool, this coupling 7 comprising a screw-nut system 71 (the details of which are not depicted in the figures) which is itself reversible. In the case of a stepping motor, a motor equipped with position-encoding means allowing the amplitudes of the movements performed to be identified may advantageously be chosen.

By means of the screw-nut system 71, the rotary stepping movement of the output shaft of the motor 6 is converted into a stepping translation movement of an output piston 72 of the screw-nut system.

The free end of the output piston 72 is screwed into one end of a shaft 73 that controls the plug 2, emerging in the chamber 10, and the opposite end of which is fixed to the central region of the end 22 of the plug.

For this purpose, this end 22 comprises a central hole into which the control shaft 73 is clipped; the material surrounding the central hole is connected to the skirt by one or more bridges of material extending in radial planes of the skirt 21, and between which perforations or openings are defined, these being intended to allow fluid transfers between the second access 42 and the fourth access 44 of the chamber 10 under all circumstances; it will be noted that the mechanical coupling 7 extending from the rotary output shaft of the motor 6 to the end of the spool 2 is not elastically retractable, its retraction being possible only as the result of the reversibility of the screw-nut system without elastic return to a more extended position.

The thermostatic device also carries a backup independent expanding-wax thermostatic element 8 and, for this purpose, in the same way, the seat 5 for the spool 2 comprises a central disc pierced with a central hole in which the thermostatic element 8 is fixed; the central disc is connected to the annular part of the seat 5 by one or more bridges of material extending along radial planes with respect to the skirt 21, between which are defined perforations or openings intended to allow fluid transfers between the fourth access 44 and the chamber 10. Part of the thermostatic element 8, in this instance its cup 80 containing the wax, is placed directly and held fixedly in the pipe 14 extending into the base 1' and therefore into the stream of fluid travelling through this pipe 14.

Another part of the thermostatic element 8, comprising its piston 81, is housed in a flange 82 of cylindrical overall shape fixed to the fixed part of the thermostatic element and extending into the skirt 21 like the piston 81 towards the end of the control shaft 73 which is fixed into the end 22 of the spool; as the piston 81, which here constitutes the moving part of the thermostatic element, is relatively short, it is extended into the flange 82 by an operating spindle 83 designed to project out of the free end of the flange 82 when the temperature of the fluid in the pipe 14 is higher than a predetermined temperature.

The operating spindle 83 comprises, at the same end as the fixed part of the thermostatic element, a base piece which is subjected to the action of a helical return spring 84 compressed between this base piece and the internal face of the free end of the flange 82; thus, when the temperature of the stream of fluid in which the cup of the thermostatic element is immersed drops following elongation of the piston 81 and of the operating spindle 83, the spindle 83 and the piston 81 are returned to the retracted position.

In addition, a temperature sensor 9 projecting into the pipe 34 of the base 1' near the cup of the thermostatic element is mounted on the lateral wall of this pipe; the purpose of this sensor is to detect the temperature of the stream of fluid in this pipe and, in response, to transmit an electrical signal of the detected temperature to a computer (not depicted) controlling the motor 6. The computer, receiving this signal about the temperature detected, controls the motor 6 so that the latter actuates the spool 2 either in proportion to the difference between the detected-temperature signal and a setpoint temperature signal it generates on the basis of, for example, the running conditions, and therefore in proportion to the difference between the detected temperature and the setpoint temperature, or on the basis of some other non-proportional chosen algorithm.

Thus, the output shaft of the motor 6 is actuated in rotation in one direction or the other according to the direction of the variations in temperature of the fluid in the pipe 14 of the base 1' which are detected by the sensor 9 and moves the spool 2 in translation in one direction or the other via the inelastic reversible screw-nut mechanical coupling system 7 in proportion to the difference between the temperatures or according to some other algorithm.

When there is a rise in temperature, the movement of the coupling 7 is a retraction which gradually causes the first access 41 to be plugged and the third access 43 to be uncovered; when there is a reduction in temperature, the movement of the coupling 7 is an extension which gradually causes the uncovering of the first access 41 and the plugging of the third access 43.

Assuming that the motor 6, the sensor 9 or the computer, or any other item in the control sequence located between the sensor and the motor is experiencing a failure and the spool 2 is thus not actuated in terms of translation in the direction for plugging the first access 11 and uncovering the third access 43 even though it should have been, given the temperature of the fluid, the moving part of the thermostatic element (that is to say, in this instance, its piston) which also extends and retracts as the temperature in the pipe 14 of the base 1 respectively rises and falls, takes over from the motor 6 to actuate the spool in terms of translation as soon as the temperature of the stream of fluid exceeds by a certain value, for example by 5° C., the temperature which should have caused actuation by the normal actuating sequence involving the screw-nut system (FIG. 2). Because the coupling 7 is inelastic and the screw-nut system 71 is reversible, the translational movement of the spool 2 imparted to the control shaft 73 causes, via the screw-nut system 71, a rotation of the motor which, to within the amount of, in this instance, 5° C., corresponds to the rotation that the motor should have effected; furthermore, the spool 2 remains in the same position even if the thermostatic element cools.

It may be noted that the setting modes prescribed by the computer no longer then meet the requirements, and that signals indicating failure can then be created.

It may also be noted that the value of the temperature threshold that triggers the intervention of the thermostatic element 8 is determined by the characteristics of the two actuating sequences for the spool 2 (the one involving the motor and the one involving the thermostatic element) and also by the distance separating the free end of the operating spindle 83 from that of the control shaft 73 in normal operating conditions.

There are various possible configurations of cooling circuit for an internal combustion engine, for example of a vehicle.

In a first configuration, the outlet from the internal combustion engine is connected to the inlet of a radiator and to the inlets of various pieces of equipment such as a unit heater, a gearbox oil heat exchanger and an engine oil heat exchanger, and the first access 41 is connected to the line connecting, on the one hand, the radiator and, on the other hand, the engine and these pieces of equipment; it is therefore a hot fluid inlet. The second access 42 is connected to the outlet of the equipment items mentioned above and is therefore a less-hot fluid inlet. The third access 43 is connected to the outlet of the radiator and is a cold fluid inlet. The fourth access 44 is connected to the inlet of the engine via a circulating pump and is a fluid outlet which may be at the temperature of the fluid leaving the engine or the fluid leaving the radiator, or at a lower temperature depending on whether the plug is fully opening the first access and closing the third, or closing the first access, or occupying an intermediate position, depending on the algorithm in the computer, in this instance the vehicle on-board computer.

In a second configuration, the outlet from the internal combustion engine is connected to the fourth access 44, and this is a hot fluid inlet; the third access 43 is connected to the inlet of the cooling radiator and is a hot fluid outlet because it is always more or less in communication with the fourth access; the first access 41 is connected to the inlet of the engine via the pump, and is therefore an outlet which, when this access is not plugged, is a hot fluid outlet; the second access 42 is connected to the inlets of the other equipment items already mentioned and is a hot fluid outlet because it is always in communication with the fourth access; the outlets from the radiator and from the other equipment items are also connected to the inlet of the engine via the pump. In this case, the thermostatic device does not act as a mixer but splits the inlet hot fluid between the engine, the radiator and the other items of equipment so that the engine receives cooling fluid at the appropriate temperature.

In both instances, appropriate means are provided to check that the thermostatic device is "open" (first access 41 uncovered) for cold-starting the engine.

The thermostatic device depicted diagrammatically in FIGS. 3 and 4 is a shutter-type thermostatic valve with three fluid accesses or ports which may be fluid inlets or outlets depending on the hydraulic circuit in which the device is inserted.

In FIGS. 3 and 4 and in the remainder of the text, elements which correspond identically or approximately to elements in FIGS. 1 and 2 and the earlier part of the description carry the same numerical references.

This thermostatic device comprises a housing 1 with a chamber 10 of cylindrical overall shape and a plug 2' mounted to slide in the housing and consisting of a shutter.

The chamber 10 comprises a first access 41 which can be plugged by the shutter 2' and for this purpose has a frusto-conical seat 411 flaring towards the outside of the chamber to bear on the lateral wall of the shutter; this first access 41 extends into an end wall of the chamber 10 and is centered on the longitudinal central axis thereof; it can be plugged gradually by the shutter from a shutter position in which this shutter is away from the seat 411 to a position in which it rests on the seat, and can be gradually uncovered in the opposite direction.

At its opposite end to the end into which the first access 41 extends, the chamber has another access 44, also centered on the longitudinal central axis of the chamber, and which is not pluggable.

The housing 1 is designed to be fixed to a housing base 1' to which the housing can be fixed by screws passing through respective flanges of the housing 1 and of the base 1'; the chamber 10, the lateral wall of which is housed over at least part of its length in the base 1', is therefore extended, beyond the said other access 44, by a pipe 14 extending into the base 1' in the direction of the longitudinal central axis of the chamber 10. An additional access 43, which is also not pluggable, opens into the lateral wall of this pipe 14.

The first access 41 is an orifice extending into the lateral part of the wall of a pipe 11 formed in a single piece with the housing and which extends in a radial direction with respect to the chamber 10 on the other side of the shutter 2'.

To actuate the shutter 2' in terms of translation selectively in one direction or the other along the extension of the longitudinal central axis of the chamber 10, an actuator with a motor 6 is fixed to the housing and more precisely to the lateral wall of the pipe 11 opening into the chamber via the pluggable access 41.

As this motor 6 and its coupling 7 connecting it to the plug 2' are, in this instance, identical to those of the embodiment depicted in FIGS. 1 and 2, they will not be described again; put simply, the control shaft 73 is fixed to the central region of a shutter 2' instead of being fixed to the central region of the end of a spool.

For this purpose, the shutter 2' comprises a central hole into which the control shaft 73 is clipped.

This thermostatic device also furthermore comprises an independent expanding-wax backup thermostatic element 8; to carry this thermostatic element 8, the internal surface of the region of the side wall of the chamber 10 that is near the access 44 which opens into the pipe 14 of the base 1' has an annular groove 102 into which are clipped the ends of a bridge 85 extending diametrically across the chamber and pierced with a central hole in which the thermostatic element 8 is fixed.

As before, part of the thermostatic element 8, namely its cup 80 containing the wax, is placed directly and held fixedly in the pipe 14 extending into the base 1 ' and therefore into the stream of fluid travelling through this pipe 14. Because the way in which the thermostatic element 8 is mounted is identical to the way in the previously described embodiment, it will not be described again.

Also, as in the previously described embodiment, a temperature sensor 9 extending into the pipe 14 of the base 1' in close proximity to the cup of the thermostatic element is carried by the lateral wall of the pipe; this sensor in this instance is approximately opposite the additional access 43; the function of this sensor is identical to that of the sensor in the previous embodiment.

Thus, the output shaft of the motor 6 is actuated in terms of rotation in one direction or the other according to the directions of the variations in temperature of the fluid in the pipe 14 of the base 1' which are detected by the sensor 9 and, in proportion with the difference between the detected temperature and the setpoint temperature or according to some other algorithm, moves the shutter 2' in translation in one direction or the other via the reversible screw-nut system inelastic mechanical coupling 7.

In the event of a temperature rise, the movement of the coupling 7 is a retraction which gradually causes the first access 41 to be uncovered; in the case of a drop in temperature, the movement of the coupling 7 is an expansion which gradually causes the first access 41 to be plugged.

Assuming that the motor 6, the sensor 9 or the computer or any other element in the control sequence between the sensor and the motor is experiencing a failure and the shutter 2' is thus not actuated in translation in the direction for uncovering the first access 41 even though it should have been, given the temperature of the fluid, the moving part of the thermostatic element (that is to say its piston) which also extends and retracts as the temperature in the pipe 14 of the base 1' respectively rises and falls, takes over from the motor 6 to actuate the shutter in terms of translation as soon as the temperature of the stream of fluid exceeds by a predetermined amount, for example by 5°, the temperature which should have caused actuation by the normal actuating sequence involving the screw-nut system (FIG. 4). As the coupling 7 is inelastic and the screw-nut support 71 is reversible, the translational movement of the shutter 2' imparted to the control shaft 73 causes, via the screw-nut system 71, a rotation of the motor which, to within the amount of, in this instance, 5° C., corresponds to the rotation that the motor should have effected; the shutter 2' remains in the same position even if the thermostatic element cools.

As the shutter 2' no longer closes, the regulation modes prescribed by the computer no longer meet the requirements and signals indicating failure can then be generated.

The value of the temperature threshold amount that triggers the intervention of the thermostatic element 8 is determined by the characteristics of the two sequences that actuate the shutter 2' (the one involving the motor and the one involving the thermostatic element) and also by the distance separating the free end of the operating spindle 83 from that of the control shaft 73 under normal operating conditions.

Various configurations are possible in a cooling circuit of an internal combustion engine, for example for a vehicle.

In a first configuration, the internal combustion engine outlet is connected to the inlet of a radiator and to the inlets of various items of equipment such as a unit heater, a gearbox oil heat exchanger and an engine oil heat exchanger, and the additional access 43 is connected to the line connecting these elements; it is therefore hot liquid inlet access. The first access 41 is connected to the outlet of the radiator and is therefore a cold liquid inlet access. The other access 44 is connected to the inlet of the engine via a circulating pump and is therefore a hot or warm liquid outlet access depending on whether or not the first access 41 is plugged according to the computer algorithm. The unit heater and heat exchanger outlets are also connected to a (different) inlet of the circulating pump.

In a second configuration, the outlet of the internal combustion engine is connected to the inlets of the unit heater and of the exchangers, and to the additional access 43; it is therefore hot liquid inlet access. The first access 41 is connected to the inlet of the radiator and is therefore a hot liquid outlet access. The other access 44 is connected to the inlet of the engine via the pump and is therefore a hot liquid outlet; the outlet of the radiator is connected to the same inlet of the pump to supply it with cold liquid. The outlets of the unit heater and of the heat exchanger are connected to another inlet of the pump. In this case also, the thermostatic device does not itself act as a mixer, but distributes the hot inlet fluid between the engine and the radiator so that the engine receives cooling fluid at the appropriate temperature.

In these two cases also, appropriate means make it possible to check that the thermostatic device is "open" for cold-starting the engine.

The thermostatic device depicted diagrammatically in FIG. 5 is a thermostatic valve with a flat shutter identical to the device of FIGS. 3 and 4 except that it also allows a bypass function; hence, only those of its components that are in addition to the device of FIGS. 3 and 4 will be described, the common members being identified in the figure using the same numerical references. In this variation of the device of FIGS. 3 and 4, the base 1' internally comprises, at the opposite end to its bearing face for the housing 1 and beyond the sensor 9 and the additional access 43 when working away from this bearing face, a chamber 10' aligned with the chamber 10 of the housing 1 and of larger cross section than the internal region of the pipe 14 in which the lateral wall of this chamber 10 is housed, so that it can connect to this region via a shoulder. Furthermore, the cup 80 of the thermostatic element 8 is extended away from the piston 81 by a foot 86 to which is fixed a bowl-shaped bypass sealing shutter 87 of larger cross section than the internal region of the pipe 14 in which the lateral wall of the chamber 10 of the housing 1 is housed and the bottom of which is on the same side as the shoulder so that the latter constitutes the seat 11' for the shutter 87. A bypass access 12' naturally opens into the chamber 10' of the base 1'. With this setup, the bypass sealing shutter 87 is of course in the widest-open position when the plug 2' is in the closed position, and in the closed position when the sensor 9 detects a very high temperature.

Of course, the invention is not restricted to the embodiments described hereinabove and depicted and others may be envisaged without departing from its scope, particularly embodiments suited to other applications, for example in oil circulation circuits or fuel circulation circuits for vehicles, or alternatively heating circuits or any other application involving a circuit through which there flows a fluid whose temperature is to be regulated.

What is claimed is:

1. A thermostatic device comprising:
 a housing having
  a chamber comprising
   a plug, and
   at least two fluid accesses, at least one of which being a pluggable access that can be plugged by said plug;
  a sensor operable to detect a temperature of a stream of fluid traveling through said thermostatic device;
 a motor, fixed to said housing;
 a coupling having
  a screw-nut system operable to actuate said plug so as to selectively translate said plug in a direction in which said plug plugs said pluggable access and in a direction in which it gradually uncovers said pluggable access according to the temperature of the stream of fluid traveling through said thermostatic device detected by said sensor;
  an output shaft connected mechanically to said plug by said coupling and able to rotate and having a reversible direction of rotation;
 a backup thermostatic element located at least partially in the stream of fluid traveling through said thermostatic device and comprising
  a moving part operable to actuate said plug so as to translate said plug when, as a result of a failure, said plug has not been actuated by said screw-nut coupling system and the temperature of the stream of fluid exceeds by a predetermined value a temperature that should have caused actuation of said plug by said screw-nut system; wherein
 said motor when at rest presents a resistive torque so as to allow a set position of said motor to be maintained,
 said coupling is substantially inelastic, and
 said screw-nut system is reversible so that if said plug is actuated by said moving part, said plug transmits translational movement to said screw-nut system causing said motor to rotate.

2. A thermostatic device according to claim 1, wherein said motor is an electric motor electrically powered at rest and operable to present a resistive torque that is appreciably higher than torque due to friction.

3. A thermostatic device according to claim 2, wherein said motor is a stepping motor.

4. A thermostatic device according to claim 2, wherein said motor is a brushless motor having no commutator.

5. A thermostatic device according to claim 1, wherein said motor is a stepping motor equipped with a position-encoding device.

6. A thermostatic device according to claim 1, wherein the predetermined value is about 5° C.

7. A thermostatic device according to claim 1, wherein said backup thermostatic element comprises a fixed part, said thermostatic device comprising:
 a base, fixed to said housing, and comprising a pipe into which a non-pluggable one of said accesses of said chamber opens, wherein said sensor and said fixed part are at least partially situated in said pipe.

8. A thermostatic device according to claim 1, wherein two of said fluid accesses of said chamber are pluggable accesses that can be plugged by said plug, and said plug comprises a spool selectively actuatable in a direction in which said spool gradually plugs one of said two pluggable accesses while gradually uncovering the other of said two pluggable accesses.

9. A thermostatic device according to claim 8, wherein two of said fluid accesses of said chamber are non-pluggable accesses which cannot be plugged by said plug and which are constantly in communication.

10. A thermostatic device according to claim 1, wherein said at least two fluid accesses of said chamber comprise one pluggable access that can be plugged by said plug and said plug comprises a shutter selectively actuatable in a direction in which said shutter gradually plugs one of said accesses and vice versa.

11. A thermostatic device according to claim 10, comprising:
- a base, fixed to said housing, and comprising a pipe into which a non-pluggable one of said accesses of said chamber opens; and
- an additional non-pluggable access which opens into a side wall of said pipe.

12. A thermostatic device according to claim 11, wherein said backup thermostatic element comprises a cup and a bypass sealing shutter, said bypass sealing shutter being secured to said cup, and said base internally comprises a base chamber having a bypass access that opens into said base chamber and that is connected to an internal region of said pipe by a seat for said bypass sealing shutter, said bypass sealing shutter being movable to a widest-open position when said plug is in a closed position, and said bypass sealing shutter being movable to a closed position when said sensor detects a very high temperature.

* * * * *

UNITED STATES PATENT AND TRADEMARK OFFICE
CERTIFICATE OF CORRECTION

PATENT NO.   : 6,343,746 B2  
DATED        : February 5, 2002  
INVENTOR(S)  : Jean-Pierre Chamot et al.

It is certified that error appears in the above-identified patent and that said Letters Patent is hereby corrected as shown below:

<u>Title page,</u>
Please add the following new item:

-- [30]     Foreign Application Priority Data
   December 7, 1999     (FR) ………………………….. 99 15429 --

Signed and Sealed this

Tenth Day of September, 2002

*Attest:*

*Attesting Officer*

JAMES E. ROGAN
*Director of the United States Patent and Trademark Office*